United States Patent
Rasmussen et al.

(10) Patent No.: US 11,340,003 B2
(45) Date of Patent: May 24, 2022

(54) THERMAL MONITORING FOR COOLING SYSTEMS

(71) Applicant: Hoffman Enclosures, Inc., Anoka, MN (US)

(72) Inventors: Michael Rasmussen, Ramsey, MN (US); William Hanson, Edina, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 107 days.

(21) Appl. No.: 16/540,383

(22) Filed: Aug. 14, 2019

(65) Prior Publication Data

US 2020/0056822 A1 Feb. 20, 2020

Related U.S. Application Data

(60) Provisional application No. 62/718,636, filed on Aug. 14, 2018.

(51) Int. Cl.
*F25B 49/02* (2006.01)

(52) U.S. Cl.
CPC ....... *F25B 49/027* (2013.01); *F25B 2600/111* (2013.01); *F25B 2700/2116* (2013.01)

(58) Field of Classification Search
CPC .............. F25B 49/027; F25B 2600/111; F25B 2700/2116
See application file for complete search history.

(56) References Cited

U.S. PATENT DOCUMENTS

| 4,007,605 | A | | 2/1977 | Denny |
| 5,086,626 | A | * | 2/1992 | Iida .................. F24F 1/0093 |
| | | | | 62/184 |
| 5,813,249 | A | * | 9/1998 | Matsuo ............... B60H 1/3229 |
| | | | | 62/509 |
| 5,987,903 | A | | 11/1999 | Bathla |
| 7,114,343 | B2 | | 10/2006 | Kates |
| 7,201,006 | B2 | | 4/2007 | Kates |
| 7,244,294 | B2 | | 7/2007 | Kates |
| 7,275,377 | B2 | | 10/2007 | Kates |
| 7,331,187 | B2 | | 2/2008 | Kates |
| 7,343,751 | B2 | | 3/2008 | Kates |
| 7,469,546 | B2 | | 12/2008 | Kates |
| 7,712,319 | B2 | | 5/2010 | Braun, II et al. |
| 7,748,224 | B2 | | 7/2010 | Grimm et al. |
| 7,908,875 | B2 | | 3/2011 | Smith |
| 8,037,700 | B2 | | 10/2011 | Shah et al. |
| 8,109,104 | B2 | * | 2/2012 | Doll, Jr. ................ F25B 49/005 |
| | | | | 62/129 |
| 8,948,918 | B2 | | 2/2015 | Chamorro et al. |
| 9,046,900 | B2 | | 6/2015 | Kates |
| 9,086,704 | B2 | | 7/2015 | Kates |

(Continued)

FOREIGN PATENT DOCUMENTS

| JP | H0682130 A | 3/1994 |
| JP | 2011122756 A | 6/2011 |

*Primary Examiner* — Jonathan Bradford
(74) *Attorney, Agent, or Firm* — Quarles & Brady LLP

(57) ABSTRACT

A system or method can be used to monitor operations of a heat exchanger, such as a condenser of an air conditioning system, that includes a header plate. A temperature sensor can be secured to the header plate to measure a temperature of the header plate as a proxy for a temperature or a pressure of a working fluid of the heat exchanger.

20 Claims, 4 Drawing Sheets

(56) References Cited

U.S. PATENT DOCUMENTS

| | | |
|---|---|---|
| 9,310,094 B2 | 4/2016 | Kates |
| 9,518,875 B2 | 12/2016 | Chainer et al. |
| 9,690,307 B2 | 6/2017 | Kates |
| 9,989,290 B2 | 6/2018 | Trianno et al. |
| 10,001,308 B2 | 6/2018 | Shimazu |
| 10,119,734 B2 | 11/2018 | Guldali et al. |
| 2001/0054293 A1 | 12/2001 | Gustafson et al. |
| 2006/0032255 A1 | 2/2006 | Hwang et al. |
| 2006/0196196 A1 | 9/2006 | Kates |
| 2007/0240870 A1 | 10/2007 | Hayashi et al. |
| 2007/0240871 A1 | 10/2007 | Hayashi et al. |
| 2008/0216495 A1 | 9/2008 | Kates |
| 2008/0223051 A1 | 9/2008 | Kates |
| 2009/0037142 A1 | 2/2009 | Kates |
| 2009/0187281 A1 | 7/2009 | Kates |
| 2010/0108290 A1* | 5/2010 | Maxwell ............... F24F 3/08 165/62 |
| 2010/0114380 A1 | 5/2010 | Kates |
| 2011/0308262 A1 | 12/2011 | Inadomi et al. |
| 2012/0255703 A1* | 10/2012 | Mishiro ............. F25B 39/00 165/11.1 |
| 2012/0291984 A1 | 11/2012 | Li et al. |
| 2013/0167659 A1* | 7/2013 | Tsuji ............... G01L 23/26 73/862.191 |
| 2015/0260448 A1 | 9/2015 | Avila et al. |
| 2017/0276413 A1 | 9/2017 | Takeichi et al. |
| 2018/0038621 A1 | 2/2018 | Toyoshima |
| 2018/0129233 A1 | 5/2018 | Kates |
| 2018/0209709 A1 | 7/2018 | Matsukura et al. |
| 2018/0216859 A1 | 8/2018 | Gariety et al. |
| 2018/0320920 A1 | 11/2018 | Nakata et al. |

\* cited by examiner

THERMAL MONITORING FOR COOLING SYSTEMS

CROSS-REFERENCE TO RELATED APPLICATIONS

This application claims priority to U.S. Provisional Patent Application No. 62/718,636, filed Aug. 14, 2018, the entirety of which is incorporated herein by reference.

BACKGROUND

In some thermal operations, appropriate control of equipment may depend on relatively accurate determination of system parameters. For example, in air conditioning or refrigeration systems, it may be useful to control operation of the systems based on the state of refrigerant or other working fluids.

SUMMARY

Some embodiments of the invention provide an air conditioning system that includes a condenser, a temperature sensor, and a fan. The condenser can include a header plate and conduits supported by the header plate, the conduits being configured to contain a flow of refrigerant for heat transfer within the condenser. The temperature sensor can be mounted to an exterior side of the header plate. The fan can be configured to direct air flow across the conduits within the condenser, along an interior side of the header plate. A controller in communication with the temperature sensor and the fan can be configured to: receive from the temperature sensor an indicator of a temperature of the exterior side of the header plate; and control the fan to direct air flow across the conduits within the condenser, based on the indicator of the temperature.

Some embodiments of the invention provide a thermal monitoring system for use with a heat exchanger that includes a header plate and flow conduits for a working fluid of the heat exchanger. The thermal monitoring system can include a temperature sensor and a mounting device configured to secure the temperature sensor to the header plate. The temperature sensor can be configured to measure a temperature of the header plate as a proxy for one or more of: a pressure of a working fluid flowing through the heat exchanger, or a temperature of the working fluid within the flow conduits of the heat exchanger.

Some embodiments of the invention provide a method for thermal monitoring of a cooling system, the cooling system including a heat exchanger with a header plate that supports flow conduits for a working fluid, a temperature sensor secured to the header plate, and an electronically controlled fan for the heat exchanger. A threshold temperature can be determined, the threshold temperature being a proxy for a threshold pressure of the working fluid of the heat exchanger. A current temperature of the header plate can be measured with the temperature sensor. The current temperature and the threshold temperature can be compared. The fan can be controlled with the controller to cool the flow conduits, based on the comparison between the current temperature and the threshold temperature.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
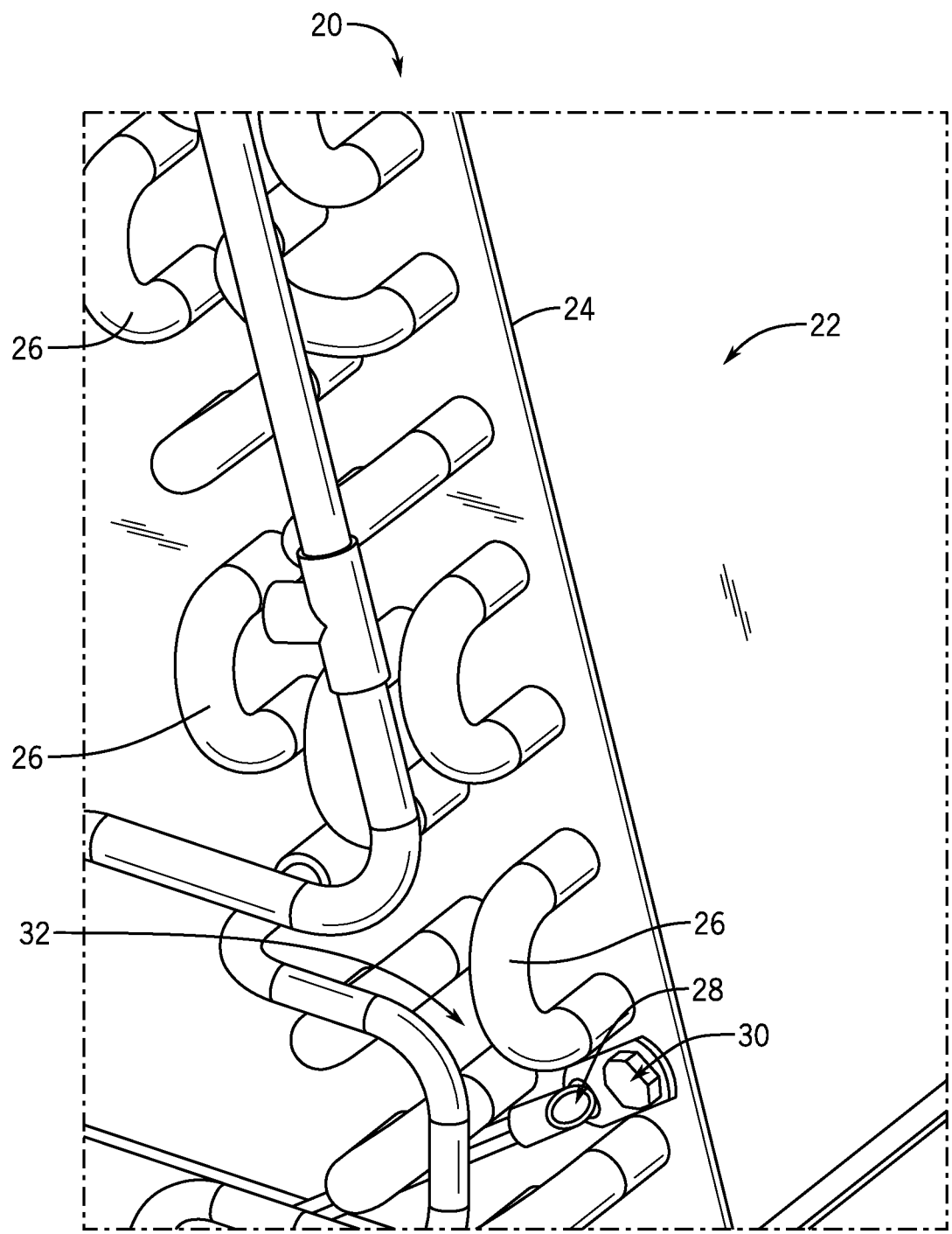
FIG. 1 is an isometric view of a temperature probe installed in a cooling system, according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Heat exchangers can typically include flow conduits that contain a working fluid and direct flow of the working fluid in such a way as to remove heat from (or deliver heat to) another object or fluid. For example, some air conditioning systems, refrigeration systems, or other cooling systems can employ air-cooled condensers to transfer heat from a refrigerant to the surrounding environment, which heat was previously removed from a separate location by the refrigerant. Depending on the setting, the condensers can be required to operate under varying ambient conditions and under varying thermal loads.

In some arrangements, performance of cooling systems can be affected by the pressure of refrigerant therein. For example, satisfactory operation of thermostatic expansion valves may depend on an appropriately high head pressure of refrigerant in a condenser. In some cases, without appropriate control, system performance may suffer during operation with reduced (or otherwise varied) thermal loads or at relatively low (or other) ambient temperatures. Accordingly, it may be useful to provide control systems that are configured to maintain refrigerant pressure (e.g., condenser head pressure) at appropriately high levels.

In some conventional approaches, pressure of refrigerant or other working fluids can be measured from pressure sensors in direct communication with the relevant fluid. For example, pressure switches or other pressure sensors can be brazed directly onto interior surfaces of refrigerant tubing of a heat exchanger, or in other cases, can be received within a hole of the refrigerant tubing and supported accordingly. When a pressure sensor is in direct communication with a refrigerant, the pressure of the refrigerant can be measured directly, which can be useful for controlling the refrigeration system. However, configuring systems for such direct pressure measurements can result in substantial manufacturing complexity and cost, including because effective operation may sometimes require the use of multiple pressure sensors: e.g., a first pressure switch to identify a first (e.g., high) refrigerant pressure to trigger control of a fan and a second pressure switch to identify a second, different (e.g., low) refrigerant pressure to trigger an alarm. Further, replacement or maintenance of such systems can be cumbersome and also costly.

Other solutions have been devised to avoid certain undesirable attributes of direct refrigerant pressure measurement. For example, under some conventional approaches, control of refrigerant pressure is effected by monitoring refrigerant temperature rather than pressure. For example, some conventional monitoring systems can include temperature probes that are directly attached to refrigerant tubes of a condenser, or that are inserted inside of a condenser (e.g., by running a cap tube through a condenser coil into fins of the condenser).

However, these and other conventional approaches can be relatively difficult to implement and may not be appropriately reliable for some applications. For example, properly installing a temperature probe onto a refrigerant tube can be relatively difficult, including with respect to properly fastening the probe to the tube and maintaining appropriate contact between the probe and the tube to ensure reliable temperature readings. Additionally, contact between the temperature probe and the refrigerant tube can expose the temperature probe to condensation, and thus to damage by water. Additionally, installation and management of electrical leads that connect to the temperature probe and interface with a controller can increase costs and complexity, including due to the need to route the leads into and out of the relevant heat exchanger and due to potential exposure of the leads to moisture within the heat exchanger, which can adversely affect system operability and accuracy.

Embodiments of the invention can provide improvements over the conventional systems discussed above, and others, for monitoring and control of heat exchanger operations, including for condensers and evaporators of refrigeration systems. For example, some systems and methods according to embodiments of the invention can allow working-fluid temperatures to be measured indirectly, including as a proxy for working-fluid pressures. This may be useful, for example, in order to inform control of cooling-system fans, to maintain appropriate working-fluid pressure within a condenser, and to implement alarms for adverse pressures or temperatures.

In some embodiments of the invention, rather than being attached to or disposed within a conduit for a working fluid of a heat exchanger (e.g., an internal heat-exchanger tube for refrigerant), a temperature sensor can be disposed to measure a temperature of a header plate of the heat exchanger as a proxy for temperature or pressure of the working fluid. For example, a temperature probe such as a thermocouple, resistance thermometer (RTD) or thermistor can be attached to a single location on an exterior side of a header plate of a condenser, rather than to or within a refrigerant tube of the condenser, and can be configured to monitor a temperature of the header plate, rather than the actual temperature of the refrigerant, to support control of fans or other system components.

This and other disclosed arrangements of a sensor to measure temperature of a header plate can avoid many of the issues discussed above and others, while still providing useful thermal data for effective system control. For example, such a placement of a temperature sensor can generally avoid exposure to condensation and gross temperature fluctuations. This can help to increase the longevity of the temperature sensor and decrease the probability of sensor failure, while also helping to provide consistent and accurate temperature readings that can be used as a reliable proxy for temperature or pressure of the relevant working fluid. Apart from these advantages, this configuration can also save considerable costs, when compared to the conventional systems described above. For example, installing, maintaining, and replacing a temperature probe on a header plate—and particularly on an exterior side of the header plate—can be relatively easy. For example, upon failure of a temperature sensor, a technician can simply access the exterior of the relevant heat exchanger (e.g., condenser), and relatively easily replace the temperature sensor, without the need to access the interior of the heat exchanger or the working-fluid conduits thereof. Further, this process can be even further simplified using mechanical mounting devices, which may allow for sensors to be installed or replaced on a header plate using simple mechanical approaches (e.g., manually, with or without using hand tools).

Some embodiments of the invention can utilize data from a temperature sensor, including as advantageously placed per the discussion above, to allow for effective control of the refrigeration system. For example, in some embodiments, relatively simple calibration of a temperature sensor can be used to associate a particular threshold (or other) temperature of a header plate, as measured with the temperature sensor, with a particular threshold (or other) pressure of a refrigerant or other working fluid. Thus, for example, when a controller senses, based on signals from the temperature sensor, that a current temperature at the header plate exceeds (or is trending to exceed) the threshold temperature or a temperature range near the threshold temperature, the controller can execute appropriate remedial measures. For example, upon identifying a header temperature that corresponds to a predetermined target peak pressure for a working fluid of a heat exchanger (e.g., a pressure that a refrigerant is not intended or rated to exceed), a controller can activate a fan that directs air flow over flow conduits of the heat exchanger, to increase heat removal from the heat exchanger and thereby reduce the pressure of the working fluid.

In other embodiments, other threshold pressures for a working fluid can be considered, with corresponding control of fans or other equipment to cause appropriate management of the working-fluid pressure. Similarly, in some embodiments, the temperature of a header plate can be used as a proxy for other relevant parameters and control systems can be activated accordingly. For example, in some embodiments, a sensed temperature of a header plate can be associated, via calibration, with an expected freezing temperature of working fluid within an evaporator. Accordingly, upon sensing that the header plate is approaching (or at) the proxy freezing temperature, such as may indicate that the working fluid may soon freeze (or may have already frozen), appropriate control actions (e.g., activation of alarms to alert operators) can be implemented.

In different embodiments, different mounting devices can be employed to secure the temperature probe to the header plate, which can streamline the installation or removal of the temperature probe. For example, in some embodiments, a screw mount can be used to directly secure a temperature probe to a header plate. In some embodiments, other types of fasteners, such as mechanical (or other) clips can be used. In some embodiments, it may be possible to use only a single, un-insulated temperature probe or other single, un-insulated temperature sensor, secured at a single location on a header plate by a single mounting device. This approach may be particularly useful in some cases, as the installation and removal of the temperature sensor can be implemented with relative ease and, as also noted above, without the need to access an interior space of a heat exchanger, to remove or replace flow conduits, or to secure the temperature sensor to a curved surface (e.g., the exterior of a flow conduit).

In some embodiments, an electronic controller, such as a programmable circuit or general purpose electronic processor device, can be configured to receive signals corresponding to temperature measurements made by a temperature sensor. In some embodiments, the temperature probe can send raw temperature measurement data to an electronic controller by wired or wireless link (e.g., directly or over a network). In some embodiments, the temperature probe or another device can first process the raw temperature measurement data before a corresponding signal is sent to the electronic controller.

In some embodiments, an electronic controller can implement control over a cooling system based on receiving from a temperature sensor electronic signals or other indicators corresponding to temperature measurements made by the temperature sensor. For example, an electronic controller can be configured to control operation of an electronically controlled fan for a condenser associated with temperature measurements made on a header plate by a temperature sensor, or to provide an alarm upon identification of header-plate temperatures that exceed a particular threshold. In some implementations, for example, an electronic controller can be configured to cycle an electronically controlled condenser fan during operation, including at relatively low ambient temperatures, to ensure that appropriate refrigerant pressure is maintained, or in some cases, not exceeded. Thus, for example, relatively sophisticated control of heat exchanger operations, including to maintain appropriate internal fluid pressures, can be implemented based on relatively simple and simply implemented temperature measurements.

In some embodiments, electronic control of a fan or an alarm can be implemented based upon associating a refrigerant pressure (e.g., a peak refrigerant pressure) with a threshold temperature measured by the temperature sensor. For example, before control of a fan or an alarm is implemented, a calibration process can be used to associate a threshold working-fluid pressure for a heat exchanger with a threshold temperature as measured at a header plate of the heat exchanger. The threshold temperature can then be stored (e.g., within a look-up table in memory) or otherwise made available for access by a relevant electronic controller during runtime operations. In some implementations, determining and storing a threshold temperature can include determining and storing a threshold temperature range, such as may include a particular threshold temperature associated with a target peak (or other) pressure or as may be associated with an identified range of pressures of interest.

FIG. 1 illustrates an aspect of a cooling system 20 according to an embodiment of the invention. In the embodiment illustrated, a condenser 22 of the cooling system 20 includes a header plate 24 and a number of heat-exchanger flow conduits configured as refrigerant tubes 26. Refrigerant (not shown) can flow through the tubes 26 to be cooled, in order to move heat from a relevant system into the ambient environment. In some embodiments, a fan (not shown in FIG. 1) can be configured to force ambient air across the condenser 22 to cool the refrigerant. In particular, for example, the fan can be configured to force ambient air across the tube 26 to the interior side of the header plate 24 (i.e., into the page in FIG. 1), such that an exterior side of the header plate 24 is exposed to little or no forced air flow.

In the cooling system 20, a single temperature probe 28 is secured directly to the header plate 24 (e.g., rather than to one of the tubes 26) using a mounting device 30. In the embodiment illustrated, the temperature probe 28 is configured as a non-insulated thermistor probe, although other configurations are possible. Similarly, in the embodiment illustrated, the mounting device 30 is configured as a metal bracket secured to the header plate 24 with a single screw, although other configurations are possible. For example, in some embodiments, clips, adhesives, magnets, or other screw-on devices can be used.

In the embodiment illustrated, the temperature probe 28 is secured to the header plate 24 in a particular region 32, generally adjacent to a select set of the refrigerant tubes 26 and located outside of the interior volume of the condenser. Thus, for example, the temperature probe 28 can be shielded from the air flow and correspondingly isolated from direct thermal effects of any forced air flow within the condenser, and can reliably provide relatively accurate indicators of an actual local temperature of the header plate 24.

In some embodiments, the location and boundaries of the region 32 can be determined for a particular system, or a particular system configuration, prior to attachment of the temperature probe 28. For example, the location and boundaries of the region 32 can be based on temperature measurements during a calibration process, in order to ensure that temperature readings by the temperature probe 28 are appropriately indicative of the temperature of refrigerant in the condenser 22. In some embodiments, a mounting location of a temperature sensor can be selected so that the temperature sensor indicates a temperature with a known, predictable (e.g., constant or constant-slope) offset from an average, maximum, minimum, or other temperature of a working fluid of the relevant heat exchanger. In some embodiments, a temperature sensor (e.g., the temperature probe 28) can be secured to a region other than the region 32.

In some embodiments, it may be useful to locate a temperature sensor closer to an outflow of air flow through a heat exchanger than to an inflow of the air flow. For example, in the embodiment illustrated in FIG. 1, the region 32 is near an outlet end of the condenser 22. Accordingly, the temperature probe 28 can sense the temperature of the header plate 24 near where the cooling air flow may be at a maximum temperature and may, accordingly, have a relatively minimal offsetting effect on the temperature of the header plate 24. However, in some embodiments, it may be desirable to mount the temperature probe 28 in other locations, including farther towards an air inflow region. In some embodiments, a temperature sensor can be installed on a header plate near a saturation region for the working fluid (e.g., refrigerant) within a heat exchanger (e.g., a condenser)—i.e., a region of the heat exchanger within which the working fluid is expected to be in a saturated state during normal operation.

Figure 2:
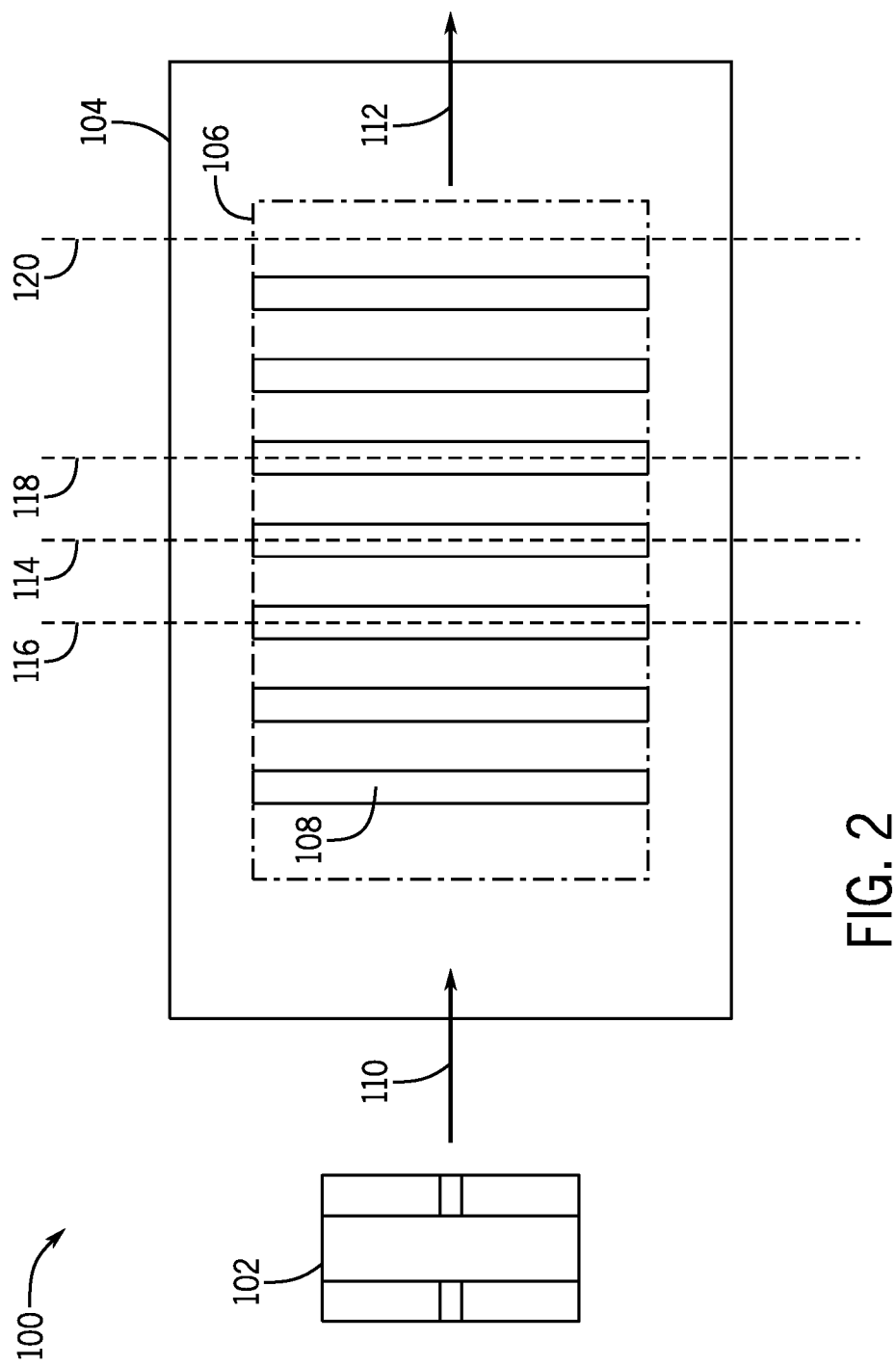
FIG. 2 is a schematic view of another cooling system, showing possible installation locations of a temperature probe.

FIG. 2 is a schematic view of a cooling system 100, illustrating possible installation locations of a temperature sensor, such as the temperature probe 28. In some configurations, the cooling system 100 can include components similar to those of the cooling system 20 discussed above. For example, in the embodiment illustrated, the cooling system 100 includes an electronically controllable fan 102, and a condenser 106 with a header plate 104. The condenser 106 has a number of refrigerant tubes 108, which are supported by and extend through the header plate 104 and which contain a refrigerant (or other working fluid) to exchange heat air flow driven by the fan 102.

Correspondingly, the fan 102 is configured to direct air across the condenser 106 to decrease the temperature of the refrigerant within the tubes 108, and thereby condense the refrigerant into a liquid. Specifically, the fan 102 forces a fluid (e.g., air) to flow into an inlet side of the condenser, indicated by reference numeral 110. As drive by the fan 102, the fluid emitted proceeds through and then exits the condenser 106 at an outlet side of the condenser 106, indicated by reference numeral 112.

As discussed above, a temperature sensor can be mounted at any location along the header plate 104 in order to measure a temperature of the header plate 104 as a proxy for the temperature or pressure of the refrigerant within the tubes 108. However, in some embodiments, it may be advantageous to mount a temperature sensor at particular locations. For example, in some installations, it may be useful to mount a temperature sensor near a central axis 114 of the condenser 106, or along axes 116 or 118, which are positioned at equal, but opposing distances away from the central axis 114. The axes 114, 116, 118 are all parallel to each other, and the axes 116, 118 can be situated ±1%, ±2%, ±5%, ±10%, ±25% of the length of the condenser 106 relative to the central axis 114, or any range in between. In some embodiments, one or more of the axes 114, 116, 118 can define a boundary of saturation region of the condenser 106.

In some embodiments, the proximity of the temperature probe 28 relative to the fan 102 can be used, rather than the axes 114, 116, 118, to determine an appropriate location of a temperature sensor. For example, a temperature sensor can be mounted on the header plate 104 at a location that coincides with the inlet side of the condenser 106 (e.g., defined as 0%), that concedes with the outlet side of the condenser 106 (e.g., defined as 100%), or any percentage value in between, for example, 25%, 50%, 75%, etc. In some embodiments, as also noted above, it may be particularly advantageous to locate a temperature sensor closer to the outlet side of the condenser 106 than the inlet side of the condenser 106, such as along an axis 120.

Figure 3:
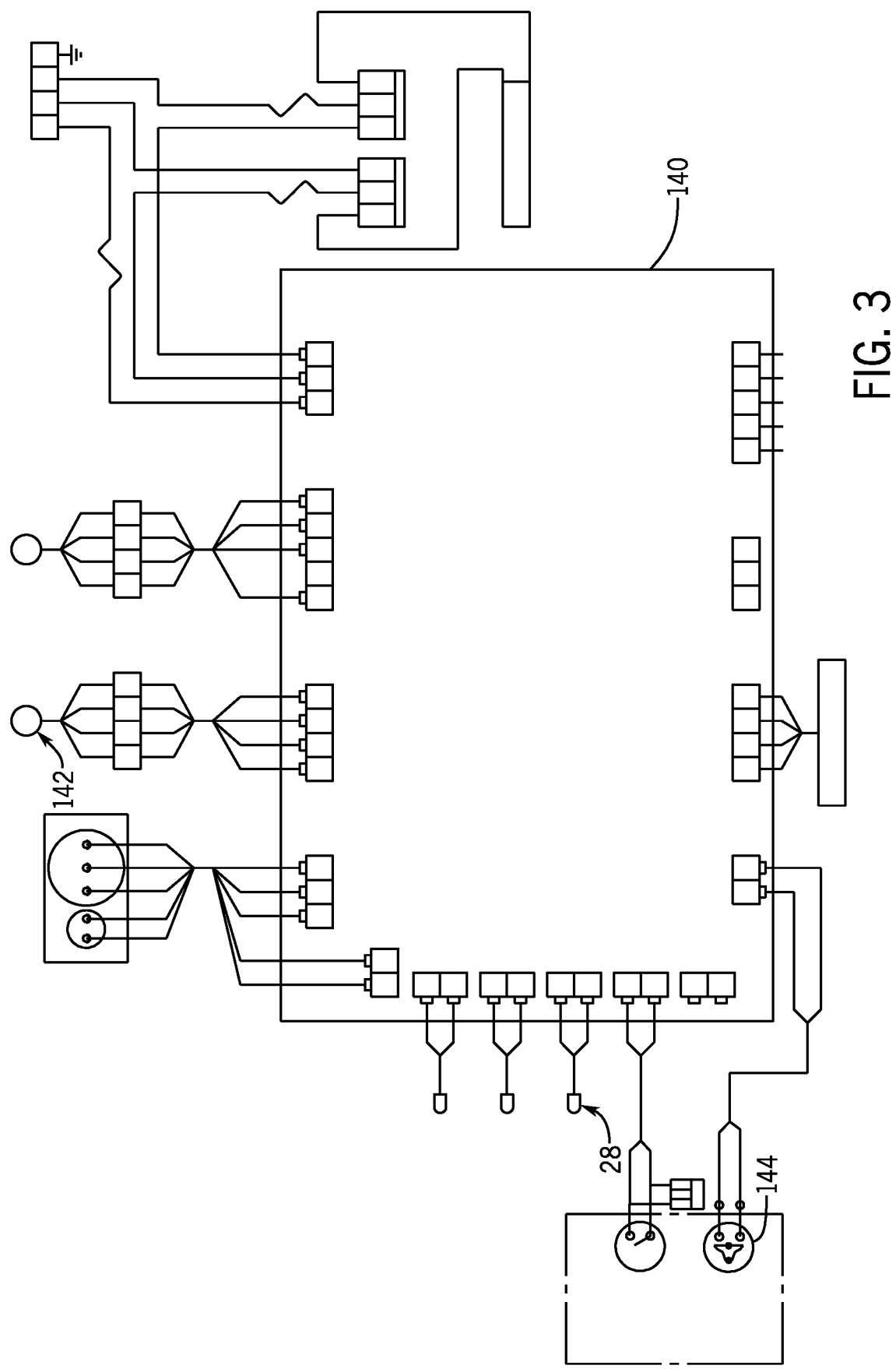
FIG. 3 is a schematic view of a control system for the cooling system of FIG. 1, according to an embodiment of the invention.

In different embodiments, different control systems can be used, including control systems that use known control techniques to implement one or more of the principles discussed herein. As an example, FIG. 3 illustrates additional aspects of the cooling system 20, including an electronic controller 140 and an electronically controlled fan 142. Generally, the fan 142 is configured to move ambient air across the condenser 22 (see FIG. 1) in order to cool the refrigerant therein. Likewise, the controller 140 is configured to control operation of the fan 142, as well as other system components. For example, in some implementations, signals corresponding to temperature measurements by the temperature probe 28—and indicative of current temperatures of the header plate 24—are relayed to the controller 140 and the controller then controls operation of the fan 142 based on the received signals.

In some embodiments, signals from the temperature probe 28 can be processed at the controller 140 (or elsewhere) before the controller 140 controls operation of the fan 142 based upon the signals. For example, in some implementations, the temperature of a header plate is expected to be different (e.g., warmer) than the refrigerant by a known amount and a corresponding temperature offset can be programmed into a digital controller (e.g., the controller 140). This offset, or other adjustment mechanism, can then be used to appropriately modify the header plate temperature, e.g., as indicated by the signal from the temperature probe 28, before implementing further control of the fan 142 or other elements of the cooling system 20. In some implementations, temperature of a header plate can be directly correlated to pressure of a working fluid of the associated heat exchanger. For example, in some implementations, the controller 140 can directly determine whether a pressure of refrigerant within the condenser 22 may be approaching, or may have exceeded, a threshold pressure based on a direct correspondence between the threshold pressure and a threshold temperature at the header plate 24.

In different implementations, a controller can be configured to implement different types of control based upon received signals relating to refrigerant temperature. For example, the controller 140 can be configured to cycle the fan 142 on and off in order to maintain proper pressure, based upon previously determined associations between a threshold temperature at the header plate 24 and a pressure of the refrigerant. As another example, the controller 140 can be configured to activate (e.g., sound or illuminate) an alarm 144 when the measured temperature is determined to be inappropriately high (e.g., above a predetermined temperature threshold, which may be associated with a target peak pressure of the refrigerant). This can be useful, for example, in order to alert a user to take remedial action, such as cleaning a dirty or blocked condenser coil or repairing or replacing a failed condenser fan.

In other embodiments, similar control can be implemented relative to other heat exchangers. For example, as also alluded to above, a control architecture similar to that illustrated in FIG. 2 can be used to determine, based on a measure temperature at a header plate, whether there is a risk of a working fluid freezing within an evaporator of an air conditioning system.

Figure 4:
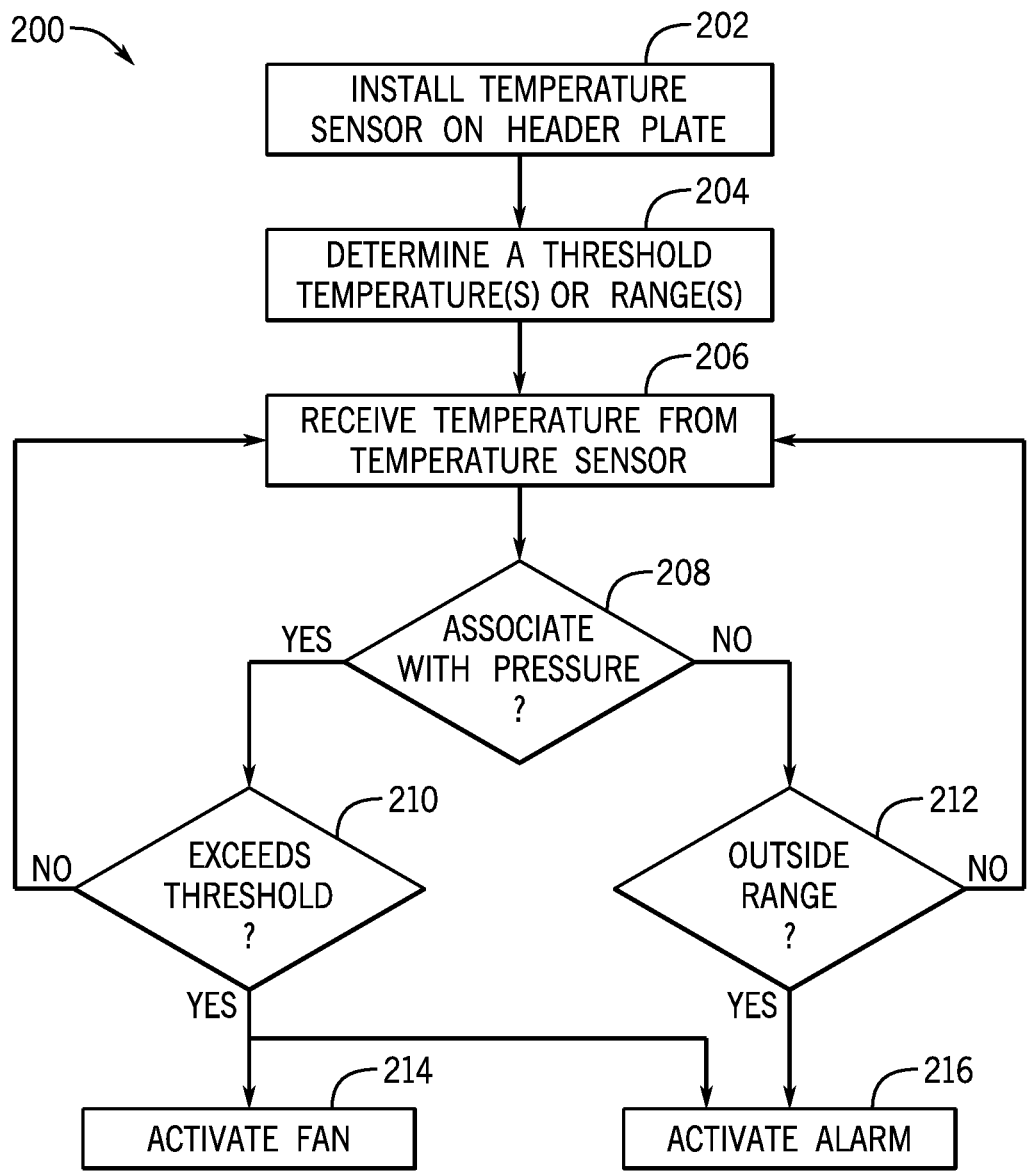
FIG. 4 shows a flowchart illustrating a process for operating a cooling system according to an embodiment of the invention.

FIG. 4 shows a flowchart illustrating a process 200 for operating a heat transfer system (e.g., an air conditioning system similar to the cooling system 20). In some embodiments, the process 200 can be executed on the controller 40, or in other cases, can be executed in whole or in part by other devices and, as appropriate, provide data to be relayed to the controller 40. As illustrated, the process 200 begins at operation 202, which includes the installation of a temperature sensor (e.g., the temperature probe 28) on a header plate of a heat exchanger (e.g., the header plate 24). In some cases, the temperature sensor is coupled to the header plate with a mounting device (e.g., the mounting device 30), which can include a fastener, a screw, a bolt, a clip, a magnetic component, an adhesive, etc. The temperature sensor can be installed on the header plate in a number of different locations, as discussed above. For example, in some embodiments, the temperature sensor is mounted near an outlet of air flow across a heat exchanger (e.g., a condenser).

Once the temperature sensor has been installed, the threshold temperature or temperature range can be determined at operation 204 of process 200. In some cases, the threshold temperature depends on the location of the temperature sensor on the header plate, as well as other factors. For example, when a threshold temperature is to be associated with a pressure of the working fluid (e.g., a target peak pressure of the working fluid), the threshold temperature may be different depending on where on the header plate the temperature sensor is mounted. For example, for a desired pressure of a working fluid the associated threshold temperature may be 100° C. at a first mounting location of a temperature sensor, while the associated threshold temperature may be 120° C. at a second mounting location of the temperature sensor. Similar considerations may also apply, for implementations in which the threshold temperature may not relate to a pressure of the working fluid but rather, for example, to a temperature at which the working fluid is in danger of freezing. Further, although example threshold temperatures have been discussed separately below, in some embodiments, there can be multiple threshold temperatures for a header plate, such as a first threshold header-plate temperature associated with a threshold working-fluid pressure and another threshold header-plate temperature associated with a threshold working-fluid temperature. Additionally, as also noted above, in some other embodiments, a threshold header-plate temperature can be part of or indicative of a range of temperatures.

Once one or more appropriate threshold temperatures have been determined, operation 206 of the process 200 can include receiving an indication of a temperature of the header plate (e.g., the current temperature) from the temperature sensor (e.g., via the controller 40). At operation 208, the process 200 can then include determining whether the threshold temperature is associated with the pressure of the relevant working fluid. If the threshold temperature is associated with the pressure of the working fluid, the current temperature from the temperature probe is compared, at operation 210 of the process 200, with the threshold temperature associated with the pressure of the working fluid. If the threshold temperature is not associated with a pressure of the refrigerant, then the threshold temperature is compared, at operation 212 of the process 200, with the current temperature from the temperature sensor. In some implementations, a particular temperature may be used in association with and not in association with a working-fluid pressure. For example, a single temperature measurement at a header plate can sometimes be used to evaluate refrigerant pressure and other factors. In some embodiments, multiple threshold temperatures (or temperature ranges) can be used. In some embodiments, the process 200 (e.g., at 208) can be configured to receive more than one input (e.g., the process 200 can execute for multiple inputs in parallel).

At operations 210 and 212, the process 200 includes comparing the current temperature of the header plate, as measured by the temperature sensor, to the threshold temperature(s) or threshold temperature range(s), respectively, as also discussed above. For example, if the operation 210 of process 200 determines the current temperature exceeds the threshold temperature (e.g., as associated with a threshold working-fluid pressure) or is outside (or, as appropriate, within) a threshold temperature range, then the fan is activated at operation 214 (e.g., with the controller) to direct air across the condenser and, as appropriate, thereby decrease the working-fluid pressure. Additionally or alternatively, with the same "yes" condition from the output of operation 210, an alarm can be activated 216 by the controller 40. In some embodiments, the alarm can be audible, tactile, visual, etc. In some embodiments, the "alarm" can be transmitted to an external device (e.g., a cell phone, tablet, etc.). Alternatively, if at operation 210, the current temperature is less than the threshold temperature, or otherwise appropriately disposed relative to the threshold temperature range, the process 200 can loop back to operation 206.

As another example, at operation 212 of process 200, if the current temperature is less than the threshold temperature or otherwise relevantly disposed relative to a threshold temperature range, then an alarm can be similarly activated 216. As also discussed above, for example, this may advantageously alert a user that the tubes of a heat exchanger are at risk of freezing. Alternatively, if at operation 212, the current temperature is greater than the threshold temperature, or similarly disposed relative to the threshold temperature range, process 200 can loop back to operation 206.

In some embodiments, the process 200 can repeat continuously, or at any predefined interval of time. In some embodiments, the process 200 can be executed in a different order than what is illustrated in FIG. 4.

Thus, embodiments of the inventions can provide improved systems and methods for monitoring temperature of cooling systems or other aspects of heat exchangers. In some embodiments, thermal monitoring systems according to the invention can improve on conventional systems for monitoring heat exchanger pressure by eliminating the need to place multiple pressure switches in direct contact with refrigerant. Likewise, embodiments of the invention can improve on conventional temperature monitoring systems by eliminating the need to secure an insulated temperature probe to heat-exchanger tubing and the need to account for potential inaccuracies in measurements by tube-mounted probes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An air conditioning system comprising:
 a condenser having a header plate and conduits supported by the header plate, the conduits being configured to contain a flow of refrigerant for heat transfer within the condenser;
 a temperature sensor mounted to the header plate;
 a fan configured to direct air flow across the conduits within the condenser, along an interior side of the header plate; and
 a controller in communication with the temperature sensor and the fan, the controller being configured to:
  receive from the temperature sensor an indicator of a temperature of an exterior side of the header plate; and
  control the fan to direct air flow across the conduits within the condenser without measuring an actual temperature of the conduits or the refrigerant, based on the indicator of the temperature.

2. The air conditioning system of claim 1, wherein the conduits extend through the header plate.

3. The air conditioning system of claim 2, wherein the controller is further configured to:
 compare the temperature to a threshold temperature; and
 activate the fan based on the comparison between the temperature and the threshold temperature.

4. The air conditioning system of claim 3, wherein the threshold temperature is associated with a threshold pressure of the refrigerant.

5. The air conditioning system of claim 4, wherein the threshold pressure of the refrigerant is a target peak pressure of the refrigerant within the condenser, during operation of the air conditioning system.

6. The air conditioning system of claim 4, wherein the controller is further configured to activate an alarm based on the comparison between the temperature and the threshold temperature.

7. The air conditioning system of claim 1, further comprising:
 a mounting device configured to secure the temperature sensor directly to the header plate.

8. The air conditioning system of claim 1, wherein the temperature sensor is mounted to the header plate closer to a location of outflow of the air flow from the condenser than to a location of inflow of the air flow into the condenser.

9. The air conditioning system of claim 1, wherein the temperature sensor is mounted to the header plate within a saturation region of the condenser.

10. The air conditioning system of claim 1, wherein the temperature sensor is shielded from the air flow by the header plate.

11. The air conditioning system of claim 1, wherein the temperature sensor is mounted to a side of the header plate outside an interior volume of the condenser.

12. A thermal monitoring system for use with a heat exchanger that includes a header plate and flow conduits for a working fluid of the heat exchanger, the thermal monitoring system comprising:
 a temperature sensor;
 a mounting device configured to secure the temperature sensor to the header plate outside of an interior volume of the heat exchanger; and
 the temperature sensor being configured to measure a temperature of the header plate without measuring an actual temperature of the flow conduits or the working fluid as a proxy for one or more of:
  a pressure of a working fluid flowing through the heat exchanger, or
  a temperature of the working fluid within the flow conduits of the heat exchanger.

13. The thermal monitoring system of claim 12, further for use with a fan configured to direct a fluid across the flow conduits within the heat exchanger, the thermal monitoring system further comprising:
 a control system configured to:
  determine a temperature of the working fluid based on the temperature measured by the temperature sensor; and
  activate at least one of an alarm or the fan, based on the determined temperature of the working fluid.

14. The thermal monitoring system of claim 13, wherein the control system is further configured to:
 compare at least one of the determined temperature or the measured temperature to a threshold temperature; and activate the at least one of the fan or the alarm, based on the comparison between the threshold temperature and the at least one of the determined temperature or the measured temperature.

15. The thermal monitoring system of claim 14, wherein the heat exchanger is an evaporator of an air conditioning system and the threshold temperature is associated with a freezing temperature of the working fluid.

16. The thermal monitoring system of claim 15, wherein the control system is further configured to activate the alarm if the temperature is less than the threshold temperature.

17. The thermal monitoring system of claim 15, wherein the temperature sensor is not insulated and is configured to be secured directly to the header plate.

18. A method for thermal monitoring of a cooling system, the cooling system including a heat exchanger with a header plate that supports flow conduits for a working fluid, a temperature sensor secured to the header plate, and an electronically controlled fan for the heat exchanger, the method comprising:

determining a threshold temperature, the threshold temperature being a proxy for a threshold pressure of the working fluid of the heat exchanger;

measuring a current temperature of the header plate with the temperature sensor, wherein the temperature sensor is secured to an exterior side of the header plate and is outside an interior volume of the heat exchanger;

comparing the current temperature and the threshold temperature; and controlling the fan with the controller to cool the flow conduits without measuring an actual temperature of the flow conduits or the working fluid, based on the comparison between the current temperature and the threshold temperature.

19. The method of claim 18, wherein the threshold pressure of the working fluid is a target peak pressure of the working fluid within the heat exchanger, during operation of the cooling system.

20. The method of claim 18, wherein the flow conduits extend through the header plate.

* * * * *